United States Patent
Bartenev et al.

(10) Patent No.: US 11,853,775 B1
(45) Date of Patent: Dec. 26, 2023

(54) SYSTEMS AND METHODS FOR PROVIDING NESTED FRONTEND APPLICATIONS FOR MANAGED SERVICE PROVIDERS

(71) Applicant: Acronis International GmbH, Schaffhausen (CH)

(72) Inventors: German Bartenev, Singapore (SG); Alexander Andreev, Sofia (BG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 17/846,418

(22) Filed: Jun. 22, 2022

(51) Int. Cl.
*G06F 9/44* (2018.01)
*G06F 9/445* (2018.01)
*G06F 9/451* (2018.01)

(52) U.S. Cl.
CPC .......... *G06F 9/44568* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 8,417,715 B1* | 4/2013 | Bruckhaus | ............. | G06Q 10/04 705/26.1 |
| 2016/0127177 A1* | 5/2016 | Pavlov | ................ | H04L 41/0806 709/226 |
| 2020/0356885 A1* | 11/2020 | Geiselhart | ............. | G06F 16/168 |

* cited by examiner

*Primary Examiner* — Craig C Dorais
(74) *Attorney, Agent, or Firm* — ArentFox Schiff LLP; Michael Fainberg

(57) ABSTRACT

Disclosed herein are systems and method for providing nested frontend applications in a user interface of a management application. An exemplary method may include: generating a graphical user interface (GUI) for the management application, wherein the GUI includes a first extension point that includes a plurality of extensions, wherein each extension of the plurality of extensions is a standalone frontend application; injecting, during runtime of the management application, a first extension into the first extension point based on a personal configuration file, wherein the first extension is included in the plurality of extensions after injection; in response to receiving, via the GUI, a selection of the first extension, generating, on the GUI, a second extension point corresponding to the first extension, wherein the second extension point includes an additional plurality of extensions; and injecting, during the runtime, a second extension into the second extension point.

20 Claims, 6 Drawing Sheets

SYSTEMS AND METHODS FOR PROVIDING NESTED FRONTEND APPLICATIONS FOR MANAGED SERVICE PROVIDERS

FIELD OF TECHNOLOGY

The present disclosure relates to the field of information technology (IT), and, more specifically, to systems and methods for providing nested frontend applications for managed service providers (MSPs).

BACKGROUND

A managed service provider (MSP) is typically a third-party company that remotely manages the information technology (IT) infrastructure and end-user systems of a customer. The working user interface (UI) of control panels of a MSP usually consist of hierarchical and dynamic (i.e., having runtime configuration) parts. However, conventional UIs lack several features and have limits that prevent MSPs from performing their IT-related tasks efficiently. For example, MSPs are unable to add custom extensions to a platform UI without development effort from the platform owner. The UIs also lack the ability to provide different configurations depending on context (e.g., different regions, user types, etc.). Furthermore, there is a lack of flexibility for the platform owner to develop new functionality as separate extensions. This makes development more expensive and difficult.

SUMMARY

In one exemplary aspect, the techniques described herein relate to a method for providing nested frontend applications in a user interface of a management application, the method including: generating a graphical user interface (GUI) for the management application, wherein the GUI includes a first extension point that includes a plurality of extensions, wherein each extension of the plurality of extensions is a standalone frontend application; injecting, during runtime of the management application, a first extension into the first extension point based on a personal configuration file, wherein the first extension is included in the plurality of extensions after injection; in response to receiving, via the GUI, a selection of the first extension, generating, on the GUI, a second extension point corresponding to the first extension, wherein the second extension point includes an additional plurality of extensions; and injecting, during the runtime of the management application, a second extension into the second extension point based on the personal configuration file.

In some aspects, the techniques described herein relate to a method, wherein in parent-child relationships, the first extension is a parent of the additional plurality of extensions and is a child of the first extension point.

In some aspects, the techniques described herein relate to a method, wherein each of the plurality of extensions is not a static part of source code of a frontend application with the first extension point.

In some aspects, the techniques described herein relate to a method, wherein injecting the first extension into the first extension point includes not modifying the source code.

In some aspects, the techniques described herein relate to a method, wherein each of the plurality of extensions is indistinguishable from native components of the management application.

In some aspects, the techniques described herein relate to a method, wherein each of the plurality of extensions is configured to determine properties of the first extension point to receive and actions to request the first extension point to execute.

In some aspects, the techniques described herein relate to a method, wherein each of the plurality of extensions is an HTML script, further including: creating a dedicated HTML container for each of the plurality of extensions; and injecting an HTML entry point in each respective HTML container of a corresponding extension.

In some aspects, the techniques described herein relate to a method, wherein an extension in the plurality of extensions and the additional plurality of extensions is shared by multiple extension points.

In some aspects, the techniques described herein relate to a method, wherein the first extension of the plurality of extensions subscribes to a property value of the first extension point such that an update in the property value is shared with the first extension and not shared with extensions in the plurality of extensions that are not subscribed to the property value.

In some aspects, the techniques described herein relate to a method, wherein a web worker controls shared properties between the first extension point and the plurality of extensions.

It should be noted that the methods described above may be implemented in a system comprising a hardware processor. Alternatively, the methods may be implemented using computer executable instructions of a non-transitory computer readable medium.

In some aspects, the techniques described herein relate to a system for providing nested frontend applications in a user interface of a management application, including: a memory; and a hardware processor communicatively coupled with the memory and configured to: generate a graphical user interface (GUI) for the management application, wherein the GUI includes a first extension point that includes a plurality of extensions, wherein each extension of the plurality of extensions is a standalone frontend application; inject, during runtime of the management application, a first extension into the first extension point based on a personal configuration file, wherein the first extension is included in the plurality of extensions after injection; in response to receiving, via the GUI, a selection of the first extension, generate, on the GUI, a second extension point corresponding to the first extension, wherein the second extension point includes an additional plurality of extensions; and inject, during the runtime of the management application, a second extension into the second extension point based on the personal configuration file.

In some aspects, the techniques described herein relate to a non-transitory computer readable medium storing thereon computer executable instructions for providing nested frontend applications in a user interface of a management application, including instructions for: generating a graphical user interface (GUI) for the management application, wherein the GUI includes a first extension point that includes a plurality of extensions, wherein each extension of the plurality of extensions is a standalone frontend application; injecting, during runtime of the management application, a first extension into the first extension point based on a personal configuration file, wherein the first extension is included in the plurality of extensions after injection; in response to receiving, via the GUI, a selection of the first extension, generating, on the GUI, a second extension point corresponding to the first extension, wherein the second extension point includes an additional plurality of extensions; and injecting, during the runtime of the management application, a second extension into the second extension point based on the personal configuration file.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for providing nested frontend applications for managed service providers (MSPS). Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Consider the following definitions of the present disclosure:

Platform—a dynamically configurable system.

Extension point—a specific place in the platform that includes extensions.

Extension—a separate part of the platform that can be dynamically and smoothly injected into extension points. Dynamically specifically means that the extensions are received in runtime and are not a static part of the extension point source code. Smoothly specifically means that a user will be unable to distinguish extensions from native components.

Configs—declarations that state which extensions will be injected into each extension point and with what parameters.

Hierarchy—an order of extensions based on the ability for extensions to have their own extension points.

The present disclosure introduces extension points in a UI of an MSP and describes how to manage their content via personal configuration files (used interchangeably with personal configs) from the backend. The personal configs may describe the set of extensions that should be injected into a particular extension point.

Figure 1:
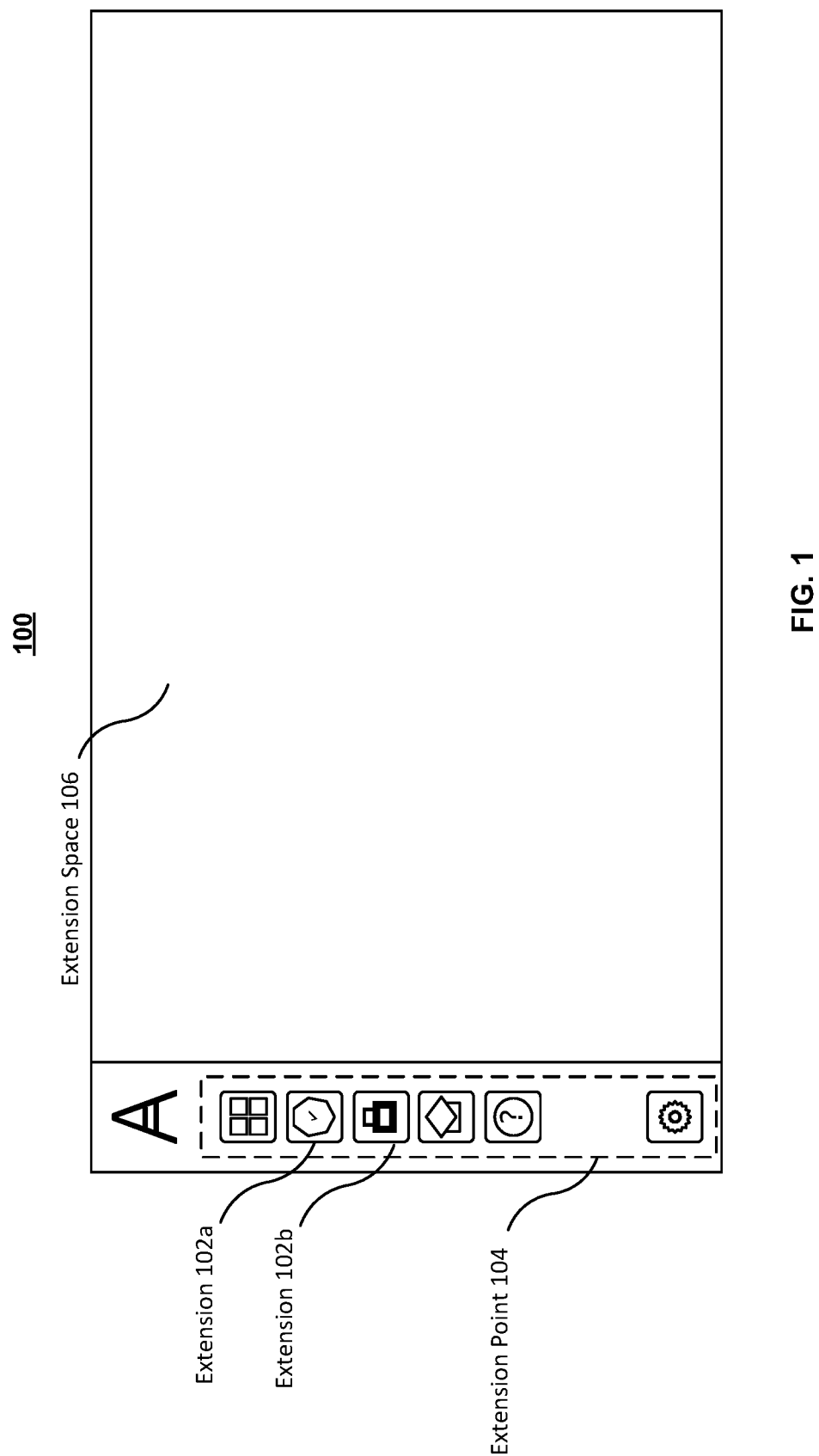
FIG. 1 is a diagram illustrating a user interface with a plurality of extensions and a first extension point.

FIG. 1 is a diagram illustrating user interface 100 with a plurality of extensions 102 and extension point 104. UI 100 depicts, for example, a toolbar that a user associated with an MSP may access. The toolbar includes a plurality of buttons that are in extension point 104. Extensions 102a and 102b are each an extension from the plurality of extensions visible in extension point 104. When a user selects extension 102a, extension space 106 is populated by the contents associated with extension 102a. When a user selects extension 102b, extension space 106 is populated by the contents associated with extension 102b.

In an exemplary aspect, each extension is a standalone frontend application, which is served (i.e., hosted) separately such that each extension is a static web asset, which has a unique URL. For example, extension 102a is a first application and extension 102b is a second application. Each extension point exposes a kind of frontend application programming interface (API), which consists of a set of properties and a set of actions. Each extension decides itself, what properties the extension wants to receive from an extension point, and what actions the extension wants to request that a parent execute. Extension points and their corresponding extensions have parent-children relationships. In this case, a "parent" is an extension point and a "child" is the extension.

In some aspects, extensions and extension points rely on subscriptions. In software architecture, publish-subscribe is a messaging pattern where senders of messages, called publishers, do not program the messages to be sent directly to specific receivers, called subscribers, but instead categorize published messages into classes without knowledge of which subscribers, if any, there may be. Similarly, subscribers express interest in one or more classes and only receive messages that are of interest, without knowledge of which publishers, if any, there are.

Accordingly, extension point 104 does not know which of its exposed properties or actions are used by a particular extension (e.g., extension 102a). Likewise, any extension may have its own next-level extension points. This is why any large frontend application can be decomposed into a tree of extensions (i.e., hierarchical extensions). A property value may be information such as language, branding, context-specific identifiers, and/or any other data that a parent owns and which is needed for children to function properly.

The present disclosure further provides an improvement of the micro-frontends approach. The micro-frontends approach involves composing multiple independent frontend applications into one, but in build time. In the micro-frontends approach, all independent frontend applications do not have any hierarchy and the approach does not declare whether and how those independent frontend applications should communicate with each other.

As described above, a frontend application may have extension points, and before rendering the extension points, the frontend application may request information from the backend (e.g., a management server) about which extensions are available for it. Information about an extension includes metadata and a URL where the extension is hosted.

In some aspects, a frontend application may be an HTML with scripts (JavaScript code). Accordingly, a dedicated HTML container is created for each extension and the HTML entry point of the corresponding extension is injected in the container. An injection is possible because of the specific in-house extension library, which provides tools for communication between an extension point and its extensions (frontend API) without any knowledge for extension point about how this frontend API is used by extensions.

Figure 2:
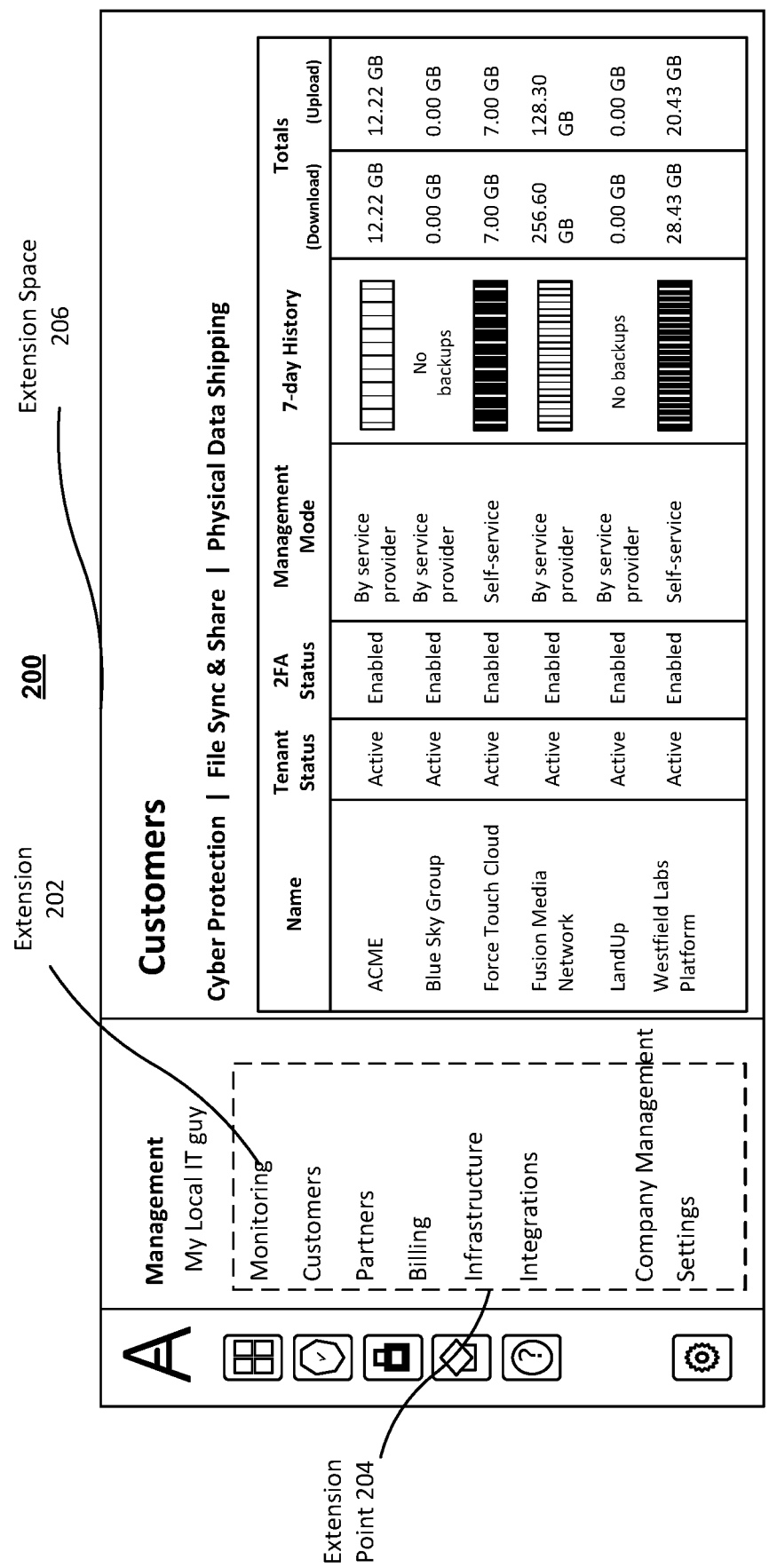
FIG. 2 is a diagram illustrating a user interface with a plurality of secondary extensions and a second extension point.

FIG. 2 is a diagram illustrating user interface 200 with a plurality of secondary extensions and a second extension point 204. For example, when a user selects extension 102a, extension point 204 may be generated for display on UI 200. Extension point 204 may include a plurality of secondary extensions, which further include extension 202. When extension 202 is selected, extension space 206 is populated by contents associated with extension 202. For example, extension 202 may allow a user of an MSP to review information about data usage across different clients.

It should be noted that a conventional UI consists of static components that are predefined and composed all together in build time. In the approach described in the present disclosure, extensions are dynamic and are injected during run time. The extension library allows communication between an extension point and any runtime injected extensions associated with the extension point. Another extension may be injected into extension point 204 by just modifying a backend response without modifying the source code of the frontend application with extension point.

The in-house extension package has a very strict design. The package uses web workers to store properties shared amongst an extension point and corresponding extensions (i.e., an extension point exposes at least one property and enables extensions to subscribe to any of the shared properties) and pass the properties to subscribers. A web worker may be a background script executed from an HTML page. The package is protected from being modified by an extension. The package brings one-way data flow between an extension point and extensions. One-way data flow provides better encapsulation as an extension cannot corrupt data in an extension point or any other extension.

The above-described extension package, frontend-to-frontend communication, and extension point JSON configs from backend leads to a complete solution for a dynamically extendable frontend with no restrictions on extension implementation (i.e., can be based on any frontend framework).

Figure 3A:
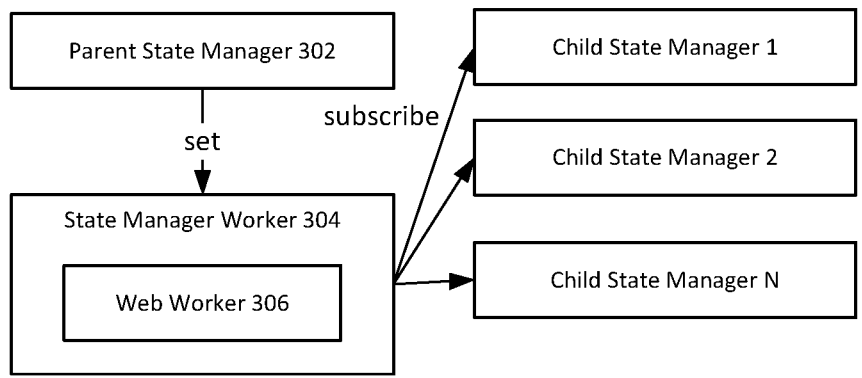
FIG. 3A illustrates a first block diagram of a parent-child relationship within a scope.

FIG. 3A illustrates first block diagram 300 of a parent-child relationship within a scope. In an exemplary aspect, scopes allow each extension to have their own next-level extension points. A scope is an independent group, which includes an extension point and all the extensions injected into the extension point. For example, a scope may include extension point 104 and extensions 102a and 102b that are injected into extension point 104.

In FIG. 3A, parent state manager 302 represents the parent and child state managers 1, 2, . . . N, each represent a child. State manager worker 304 includes web worker 306, which owns all the properties that are shared by a parent. "Set" involves setting one of these shared property values. "Subscribe" means that a new value of the shared property is received only by those children, who subscribe to receiving the property values. Accordingly, in FIG. 3A, parent state manager 302 (e.g., extension point 104) sets a property value, state manager worker 304 updates the property values, and child state managers 1, 2, . . . , N (e.g., extensions 102a, 102b, etc.) subscribe to receive the set property value.

Each extension point has its own scope and uses a parent-children relationship inside (frontend application with extension point is a parent and extensions are its children). The parent does not know what exact children will be rendered. Not knowing about which child is rendered is important because this allows a parent to handle children in a unified way. Otherwise, the parent source code would have to be adjusted each time a new child is introduced.

A parent frontend-application shares some of its "allowed" properties with children. A parent does not know which of its "allowed" properties are used by an exact child. It is the responsibility of the child to subscribe to the parent's "allowed" properties changes that the child needs. For example, a child may need information about the identifier of a tenant for whom a navigation menu is rendered (context for the screen). A child may also need information about the selected language, branding, etc.

Figure 3B:
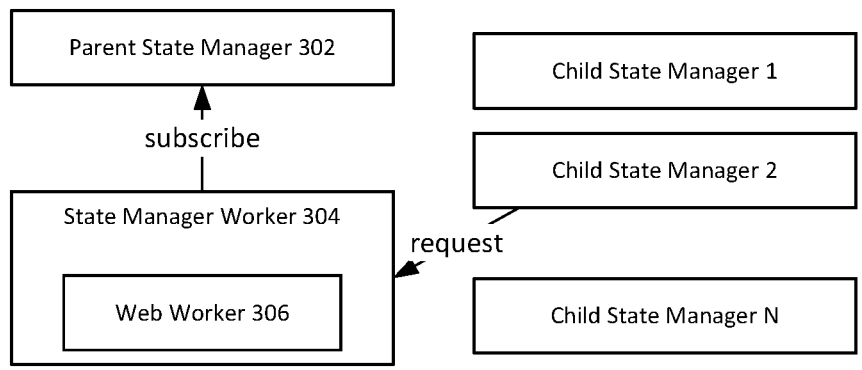
FIG. 3B illustrates a second block diagram of a parent-child relationship within a scope.

FIG. 3B illustrates second block diagram 325 of a parent-child relationship within a scope. A parent does not know which of its "allowed" actions can be requested to execute by an exact child. Nevertheless, a parent allows children to request to execute one of its "allowed" actions.

A child (e.g., child state manager 1) can send a request to a parent to execute an action. In this case, the other children (e.g., child state manager 2) of the parent will not know anything about this request and only the parent will receive it.

For example, there may be an extension point in a tenant creation wizard. In this example, extensions are the steps of the wizard. Before submitting the information from this wizard, state manager worker 304 may confirm whether each wizard step is valid. It is the responsibility of the extension (e.g., child state manager 1) to calculate their validity states and notify the parent (e.g., parent state manager 302) about their validity states changes. The child state managers can do this via actions. If the validity state of a child is changed, the child requests the parent to execute an "update my validity state" action providing the new validity state as the payload.

Figure 3C:
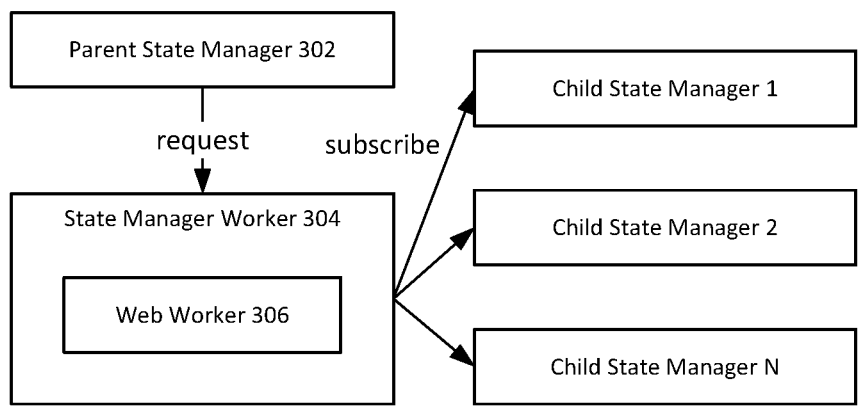
FIG. 3C illustrates a third block diagram of a parent-child relationship within a scope.

FIG. 3C illustrates third block diagram 350 of a parent-child relationship within a scope. A parent is able to request children to execute some "allowed" actions, but a parent cannot ask some exact child to execute an "allowed" action. It is the responsibility of the child to subscribe to actions execution requests from parent using an action identifier. Actions are a 2-way method of communication. In the first way, a parent can send a request to children to execute an action. However, the children must decide whether to subscribe to such requests from the parent or not. Only children who have subscribed would execute an action on their side.

Figure 4:
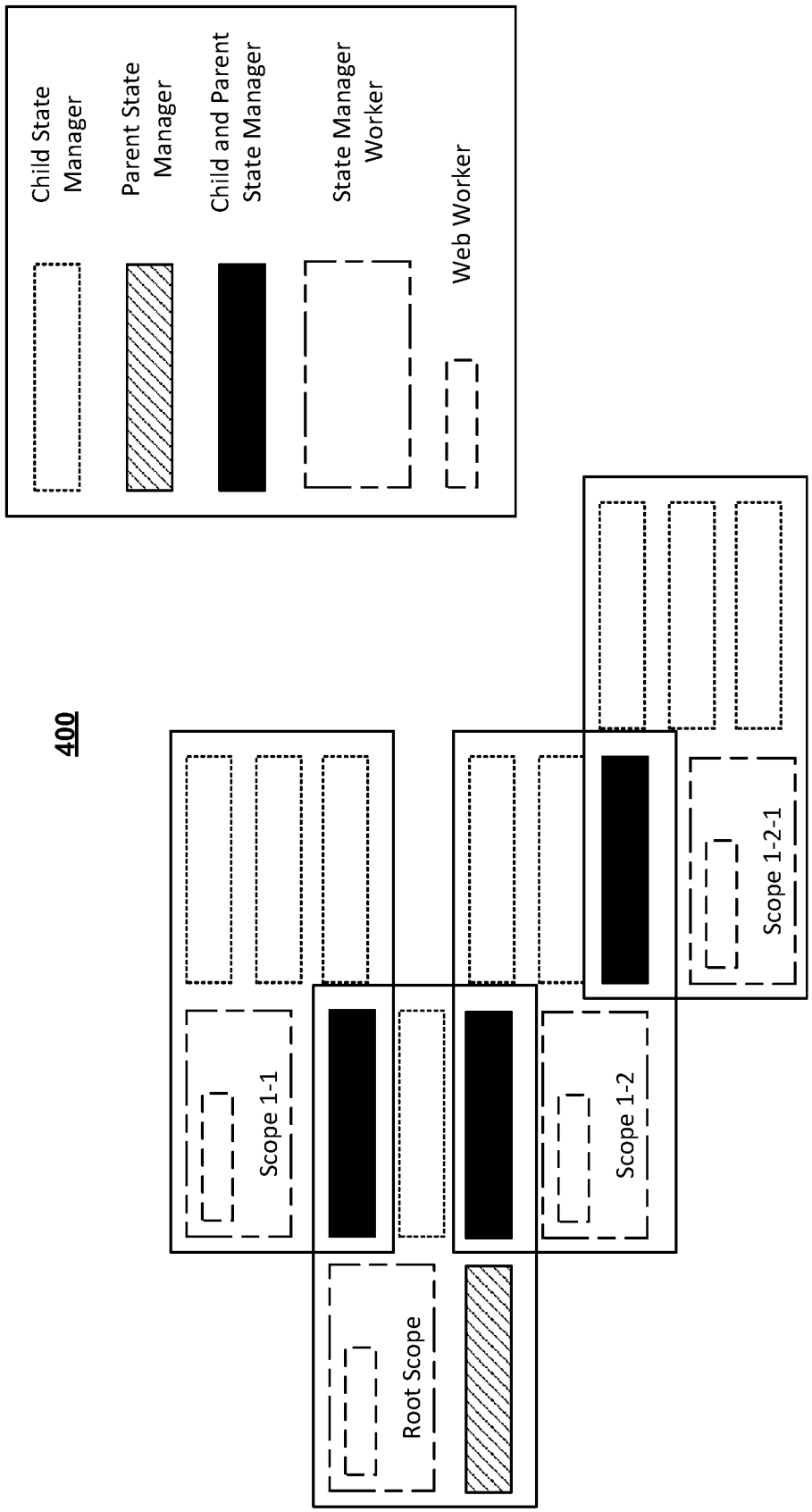
FIG. 4 illustrates a block diagram of a hierarchy of scopes.

FIG. 4 illustrates block diagram 400 of a hierarchy of scopes. The root scope includes a state manager worker with a web worker, a parent state manager, and three child state managers. Two of the child state managers serve as parent state managers for scope 1-1 and scope 1-2. Scope 1-1 incudes its own state manager worker with a web worker, along with three child state managers. Scope 1-2 includes its own state manager worker with a web worker and three child state managers. One of the child state managers in scope 1-2 serves as a parent state manager of scope 1-2-1.

Consider an example where there are two large web consoles: Cyber Protection Console and Management Portal. Each of the consoles have extension points in their navigation menus. A user of an MSP may want to join the consoles and other smaller consoles into an even larger single console. To do this, Cyber Protection Console and Management Portal are converted into extensions for a navigation menu extension point in the single Console. Both Cyber Protection Console and Management Portal will become extensions for the single console navigation menu extension point, but at the same time have their own extension points. The benefits. Originally both Cyber Protection Console and Management Portal may be based on different technology stacks (e.g., different frontend frameworks are used). Converting them to extensions allows them to be injected in the same extension point of a single console. This conversion may be performed by the developers who maintain the source code of the consoles as it involves coding. The conversion allows for easier changes in the hierarchy by modifying configuration files. For example, Management Portal's navigation menu extension can be removed from it and injected to Cyber Protection Console or the single console navigation menu extension points. Another benefit of this setup is that another $3^{rd}$-party vendor can bring its own extension to any of the extension points.

Figure 5:
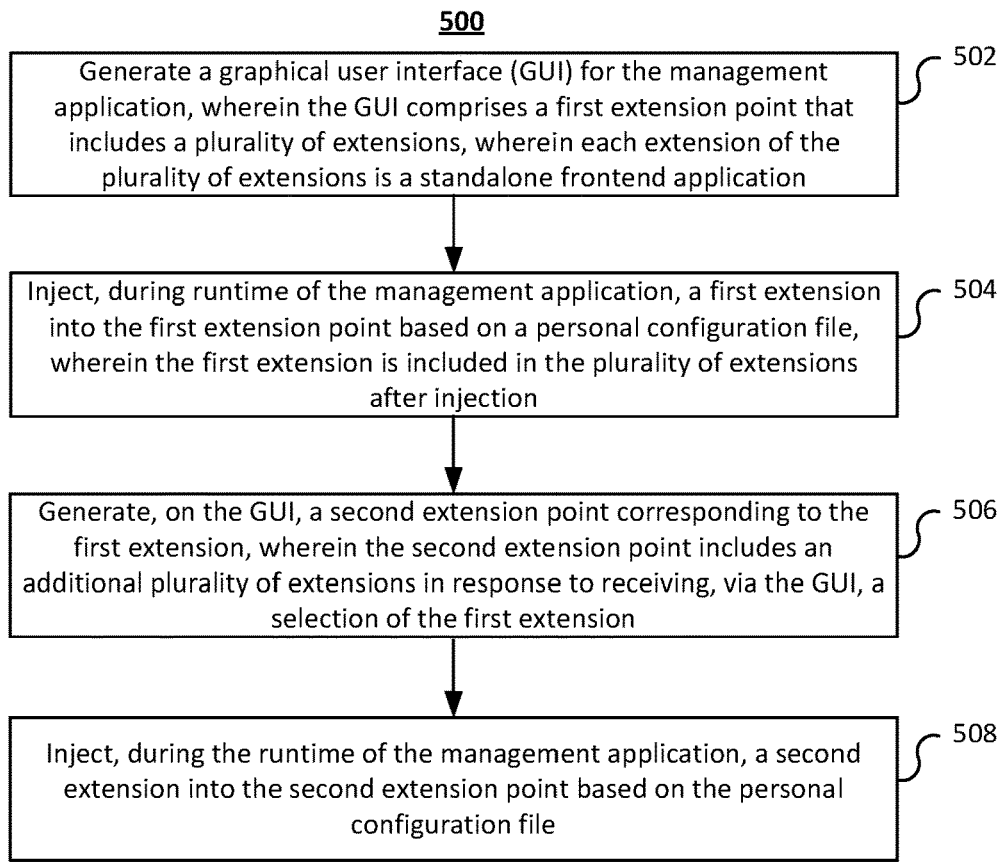
FIG. 5 illustrates a flow diagram of a method for providing nested frontend applications for a managed service provider.

FIG. 5 illustrates a flow diagram of method 500 for providing nested frontend applications for a managed service provider. At 502, method 500 includes generating a graphical user interface (GUI) for the management application. For example, user interface 100 may be generated. The GUI may comprises a first extension point (e.g., extension point 104) that includes a plurality of extensions, wherein each extension of the plurality of extensions is a standalone frontend application. It should be noted that each of the plurality of extensions is not a static part of source code of a frontend application with the first extension point. Nonetheless, each of the plurality of extensions is indistinguishable (e.g., visually and in terms of user access/interaction) from native components of the management application.

In some aspects, each of the plurality of extensions is configured to determine properties of the first extension point to receive and actions to request the first extension point to execute. In particular, the first extension of the plurality of extensions may subscribe to a property value of the first extension point such that an update in the property value is shared with the first extension and not shared with extensions in the plurality of extensions that are not subscribed to the property value. A web worker (e.g., web worker 306) may control shared properties between the first extension point and the plurality of extensions.

At 504, method 500 includes injecting, during runtime of the management application, a first extension (e.g., extension 102*a*) into the first extension point based on a personal configuration file that details which extensions to inject in a given extension point and with which parameters. The personal configuration file is stored in the platform on the backend. In some aspects, the personal configuration file may include information about extensions, their metadata and the URL to the extension. An example of a portion of a personal configuration file is shown below that describes a portion of a menu (which is an extension point):

```
{
    "id":    "cti.acronis.platform.ui.management-portal.nav-
        menu",
    "children": [
    {
    meta": {
    "header": "Tasks management",
    "icon":  "/integration/advanced-automation/ui/static/img/
        tasks-management.svg"
    },
```

```
    "order": 2,
    "children": [
    {
    "id":    "cti.acronis.platform.ui.management-portal.nav-
        menu.advanced-automation-task-management-service-
        desk",
    "meta": {
    "header": "Service desk"
    },
    "content": {
    "type": "html",
    "asset": "/integration/advanced-automation/ui/extension/
        task-management-service-desk",
    "name":  "advanced-automation-task-management-ser-
        vice-desk"
    },
    "order": 0
    },
    {
    "id":    "cti.acronis.platform.ui.management-portal.nav-
        menu.advanced-automation-task-management-time-
        entries",
    "meta": {
    "header": "Time entries"
    },
    "content": {
    "type": "html",
    "asset": "/integration/advanced-automation/ui/extension/
        task-management-time-entries",
    "name":  "advanced-automation-task-management-time-
        entries"
    },
    "order": 1
    }
    ]
    }
    ]
}
```

The injection itself is performed by the in-house extension library. Each extension point and extension has this library coded in. The library relies on data from personal configs, which indicate what to inject and where. The injection itself and data exchange between an extension point and an extension is performed by this library. The schema of data exchange performed by this library is shown in FIGS. 3A-3C. Accordingly, the first extension is included in the plurality of extensions after injection. It should be noted that injecting the first extension into the first extension point comprises not modifying the source code.

A user may then select the first extension on the GUI. At 506, in response to receiving, via the GUI, a selection of the first extension, method 500 includes generating, on the GUI, a second extension point (e.g., extension point 204) corresponding to the first extension. The second extension point may include an additional plurality of extensions. In method 500, in terms of parent-child relationships, the first extension is a parent of the additional plurality of extensions and is a child of the first extension point.

At 508, method 500 includes injecting, during the runtime of the management application, a second extension (e.g., extension 202) into the second extension point based on the personal configuration file.

In some aspects, each of the plurality of extensions is an HTML with JavaScript code. Accordingly, method 500 may further include creating a dedicated HTML container for each of the plurality of extensions, and injecting an HTML entry point in each respective HTML container of a corresponding extension.

Figure 6:
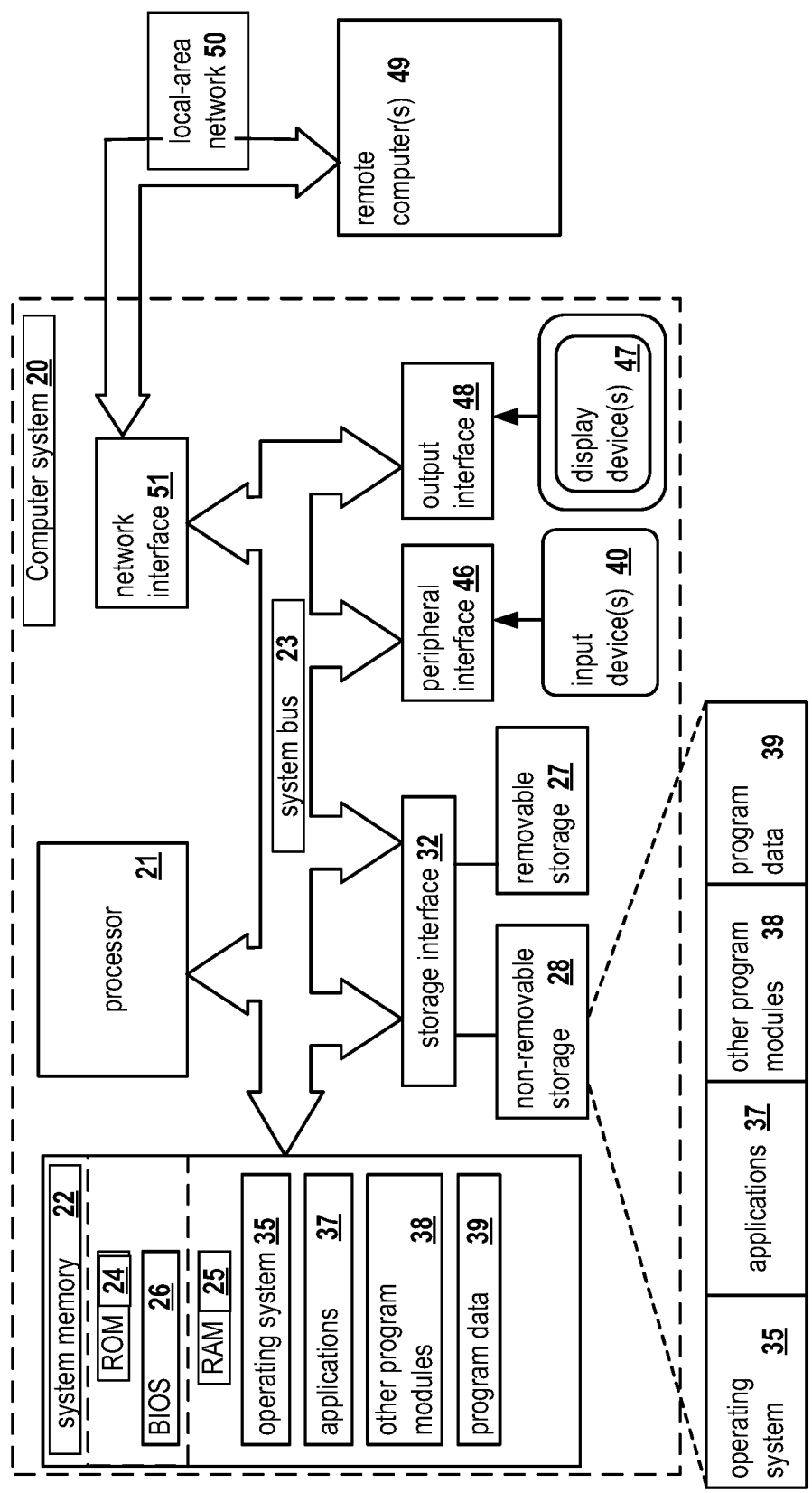
FIG. 6 presents an example of a general-purpose computer system on which aspects of the present disclosure can be implemented.

FIG. 6 is a block diagram illustrating a computer system 20 on which aspects of systems and methods for providing nested frontend applications for an MSP may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing nested frontend applications in a user interface of a management application, the method comprising:
generating a graphical user interface (GUI) for the management application, wherein the GUI comprises a first extension point that includes a plurality of extensions, wherein each extension of the plurality of extensions is a standalone frontend application;
injecting, during runtime of the management application, a first extension into the first extension point based on a personal configuration file, wherein the first extension is included in the plurality of extensions after injection;
in response to receiving, via the GUI, a selection of the first extension, generating, on the GUI, a second extension point corresponding to the first extension, wherein the second extension point includes an additional plurality of extensions; and
injecting, during the runtime of the management application, a second extension into the second extension point based on the personal configuration file.

2. The method of claim 1, wherein in parent-child relationships, the first extension is a parent of the additional plurality of extensions and is a child of the first extension point.

3. The method of claim 1, wherein each of the plurality of extensions is not a static part of source code of a frontend application with the first extension point.

4. The method of claim 3, wherein injecting the first extension into the first extension point comprises not modifying the source code.

5. The method of claim 1, wherein each of the plurality of extensions is indistinguishable from native components of the management application.

6. The method of claim 1, wherein each of the plurality of extensions is configured to determine properties of the first extension point to receive and actions to request the first extension point to execute.

7. The method of claim 1, wherein each of the plurality of extensions is an HTML with JavaScript code, further comprising:
creating a dedicated HTML container for each of the plurality of extensions; and
injecting an HTML entry point in each respective HTML container of a corresponding extension.

8. The method of claim 1, wherein an extension in the plurality of extensions and the additional plurality of extensions is shared by multiple extension points.

9. The method of claim 1, wherein the first extension of the plurality of extensions subscribes to a property value of the first extension point such that an update in the property value is shared with the first extension and not shared with extensions in the plurality of extensions that are not subscribed to the property value.

10. The method of claim 1, wherein a web worker controls shared properties between the first extension point and the plurality of extensions.

11. A system for providing nested frontend applications in a user interface of a management application, comprising:
a memory; and
a hardware processor communicatively coupled with the memory and configured to:
generate a graphical user interface (GUI) for the management application, wherein the GUI comprises a first extension point that includes a plurality of extensions, wherein each extension of the plurality of extensions is a standalone frontend application;
inject, during runtime of the management application, a first extension into the first extension point based on a personal configuration file, wherein the first extension is included in the plurality of extensions after injection;
in response to receiving, via the GUI, a selection of the first extension, generate, on the GUI, a second extension point corresponding to the first extension, wherein the second extension point includes an additional plurality of extensions; and
inject, during the runtime of the management application, a second extension into the second extension point based on the personal configuration file.

12. The system of claim 11, wherein in parent-child relationships, the first extension is a parent of the additional plurality of extensions and is a child of the first extension point.

13. The system of claim 11, wherein each of the plurality of extensions is not a static part of source code of a frontend application with the first extension point.

14. The system of claim 13, wherein injecting the first extension into the first extension point comprises not modifying the source code.

15. The system of claim 11, wherein each of the plurality of extensions is indistinguishable from native components of the management application.

16. The system of claim 11, wherein each of the plurality of extensions is configured to determine properties of the first extension point to receive and actions to request the first extension point to execute.

17. The system of claim 11, wherein each of the plurality of extensions is an HTML with JavaScript code, and wherein the hardware processor is further configured to:
create a dedicated HTML container for each of the plurality of extensions; and
inject an HTML entry point in each respective HTML container of a corresponding extension.

18. The system of claim 11, wherein an extension in the plurality of extensions and the additional plurality of extensions is shared by multiple extension points.

19. The system of claim 11, wherein the first extension of the plurality of extensions subscribes to a property value of the first extension point such that an update in the property value is shared with the first extension and not shared with extensions in the plurality of extensions that are not subscribed to the property value.

20. A non-transitory computer readable medium storing thereon computer executable instructions for providing nested frontend applications in a user interface of a management application, including instructions for:
generating a graphical user interface (GUI) for the management application, wherein the GUI comprises a first extension point that includes a plurality of extensions, wherein each extension of the plurality of extensions is a standalone frontend application;
injecting, during runtime of the management application, a first extension into the first extension point based on a personal configuration file, wherein the first extension is included in the plurality of extensions after injection;
in response to receiving, via the GUI, a selection of the first extension, generating, on the GUI, a second extension point corresponding to the first extension, wherein the second extension point includes an additional plurality of extensions; and
injecting, during the runtime of the management application, a second extension into the second extension point based on the personal configuration file.

* * * * *